US008973766B2

(12) United States Patent
Sprang, Jr.

(10) Patent No.: US 8,973,766 B2
(45) Date of Patent: Mar. 10, 2015

(54) RACK FOR STORING CHAIN RATCHET BINDERS

(71) Applicant: Sprang Enterprises, Inc., Smithville, OH (US)

(72) Inventor: Robert E. Sprang, Jr., Smithville, OH (US)

(73) Assignee: Sprang Enterprises, Inc., Smithville, OH (US)

( * ) Notice: Subject to any disclaimer, the term of this patent is extended or adjusted under 35 U.S.C. 154(b) by 29 days.

(21) Appl. No.: 13/754,991

(22) Filed: Jan. 31, 2013

(65) Prior Publication Data

US 2013/0292348 A1    Nov. 7, 2013

Related U.S. Application Data

(60) Provisional application No. 61/643,682, filed on May 7, 2012.

(51) Int. Cl.
*A47F 7/00* (2006.01)
*B25H 3/04* (2006.01)
*B60P 7/08* (2006.01)

(52) U.S. Cl.
CPC .............. *A47F 7/0007* (2013.01); *B25H 3/04* (2013.01); *B60P 7/0823* (2013.01)
USPC ...................................... 211/70.6

(58) Field of Classification Search
CPC ............ B25H 3/003; B25H 3/04; B25H 3/06; B25H 3/00; B25H 3/02; B60P 7/0846; B60P 7/00; B60P 7/083; B60P 7/0823; A47B 81/005; A47B 88/20; A47F 7/0035; A47F 5/08; A47F 5/0884; A47F 7/0028; A47F 7/0021; A47F 7/005; A47F 7/0007; B60B 29/007; B60R 9/02; B60R 9/00; B60R 7/08; B25B 13/56; B25B 13/52
USPC ......... 211/86.01, 119.001, 119.004, 88.04, 6, 211/16, 49.1, 85.5, 193, 18, 70.6, 87.01, 75, 211/69, 70.8, 60.1, 26.2, 64; 224/545, 543, 224/547, 567, 571, 913, 922; D3/362, 147, D3/148; 248/224.8, 339, 690, 304, 301; 206/372–378, 477, 481, 483, 489
See application file for complete search history.

(56) References Cited

U.S. PATENT DOCUMENTS

| D150,797 | S | * | 8/1948 | Lane ................................ D6/468 |
| D180,106 | S | * | 4/1957 | Seifert ............................ D6/468 |
| 2,797,851 | A | * | 7/1957 | Leake ............................. 224/482 |
| 2,946,452 | A | * | 7/1960 | Caloiero et al. .................... 211/4 |

(Continued)

*Primary Examiner* — Jennifer E Novosad
(74) *Attorney, Agent, or Firm* — Sand & Sebolt

(57) ABSTRACT

A rack and method for storing tie-down chain ratchet binders on a surface. The rack includes a base that preferably is mounted on a truck wall. A first finger is provided on the base and a first recess is defined therein. The first recess is configured so that the shaft of a chain ratchet binder is receivable therein. The rack further includes a second finger spaced laterally from the first finger and defining a second recess therein that is aligned with the first recess. The shaft of the binder is received in the first and second recesses and is supported by the first and second fingers. A plurality of similarly aligned pairs of first and second fingers with associated first and second recesses is provided on the base, vertically spaced from each other. Thus, rack is able to store a plurality of chain ratchet binders vertically spaced from each other.

24 Claims, 10 Drawing Sheets

(56) References Cited

U.S. PATENT DOCUMENTS

| | | | |
|---|---|---|---|
| 3,081,056 A * | 3/1963 | Sweet et al. | 248/552 |
| 3,288,304 A * | 11/1966 | Graves | 211/64 |
| D218,616 S * | 9/1970 | Owen et al. | D6/468 |
| 3,731,817 A * | 5/1973 | Fowlkes et al. | 211/70.8 |
| 4,310,094 A * | 1/1982 | Hotchkiss, Jr. | 211/70.6 |
| 4,705,168 A * | 11/1987 | Ward | 206/373 |
| D319,361 S * | 8/1991 | Moser | D6/468 |
| D337,466 S * | 7/1993 | Moser | D6/570 |
| D339,946 S * | 10/1993 | Moser | D6/570 |
| 5,316,191 A * | 5/1994 | Gibson et al. | 224/401 |
| 5,431,074 A * | 7/1995 | Durante | 81/462 |
| D362,776 S * | 10/1995 | Thorn | D6/552 |
| 5,505,316 A * | 4/1996 | Lee | 211/70.6 |
| 5,638,964 A * | 6/1997 | Ernst | 211/70.6 |
| D392,489 S * | 3/1998 | Ernst | D6/571 |
| 6,315,121 B1 * | 11/2001 | Hansen | 206/376 |
| 6,932,224 B1 * | 8/2005 | Sandberg | 211/70.8 |
| 7,178,670 B2 * | 2/2007 | Chen | 206/376 |
| D543,078 S * | 5/2007 | Davalos | D7/701 |
| 8,403,155 B1 * | 3/2013 | Kao | 211/70.6 |
| 8,596,590 B2 * | 12/2013 | McCoy | 248/68.1 |
| 2009/0218302 A1 * | 9/2009 | Winnard | 211/70.6 |
| 2012/0055968 A1 * | 3/2012 | Parker et al. | 224/571 |

* cited by examiner

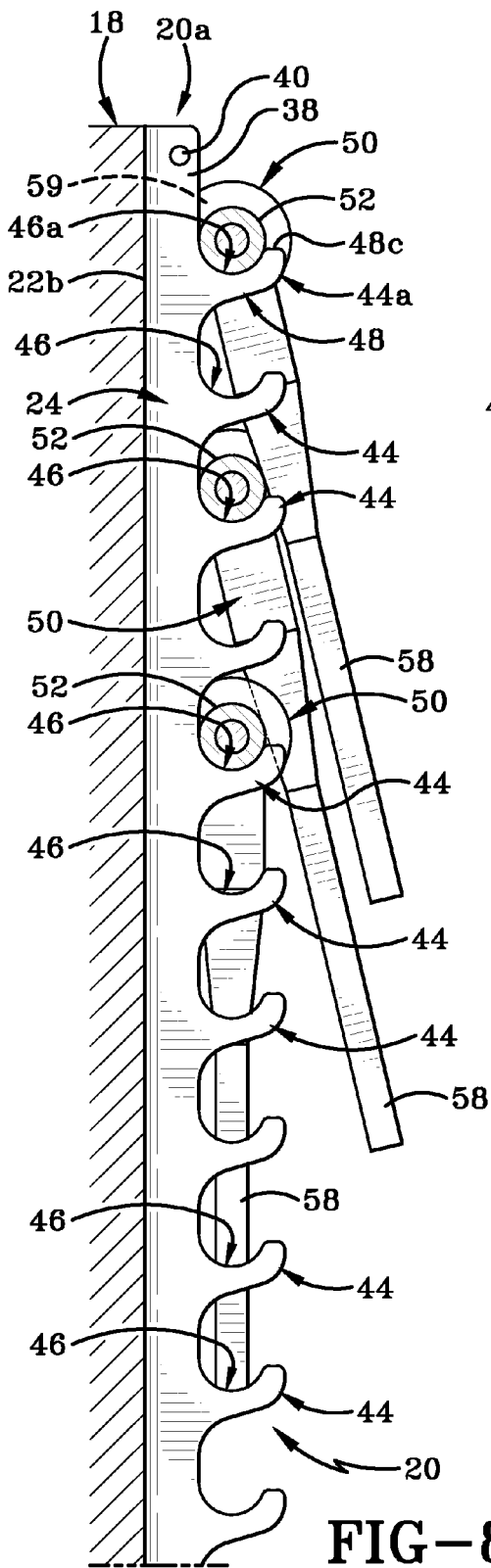
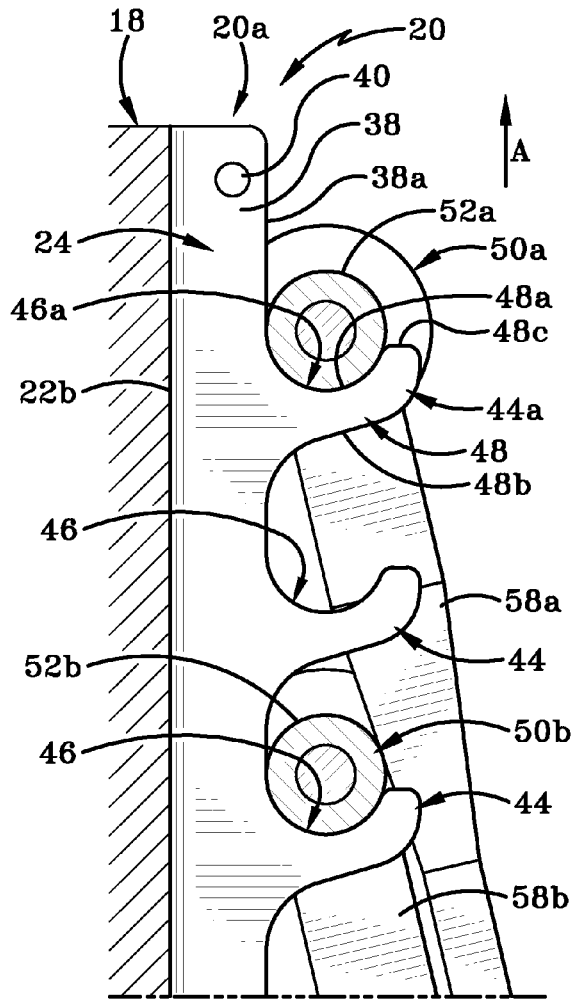
FIG-8
FIG-9

RACK FOR STORING CHAIN RATCHET BINDERS

CROSS-REFERENCE TO RELATED APPLICATIONS

This application claims the benefit of U.S. Provisional Patent Application Ser. No. 61/643,682, filed on May 7, 2012, the entire specification of which is incorporated herein by reference.

BACKGROUND OF THE INVENTION

1. Technical Field

This invention relates generally to storage devices. More particularly, this invention relates to a storage device that is used on trucks, most particularly on flat bed trucks. Specifically, this invention is directed to rack that is securable to a generally vertical surface of a flat bed truck and which is configured to store load tie-down chain ratchet binders when those chain ratchet binders are not in use.

2. Background Information

Flat bed trucks are used to transport loads which have to be tied down to the truck bed so that they don't fall off the truck during motion. Typically, the loads are secured by means of tie-down straps or more particularly tie-down chains. Once a chain has been engaged with one side of the truck bed, it is drawn over the top of the load, is engaged with the other side of the truck bed and then needs to be secured back onto itself. This is done using a device called a chain ratchet. Chain ratchet binders typically include a shaft, a hook engaged on each end of the shaft and a handle which activates a ratchet mechanism. The hooks are engaged in spaced apart links of the chain sections that are to be secured together. The ratchet mechanism is activated to draw the hooks and therefore the chain links, toward each other.

One of the issues a truck driver has is storage of the chain ratchet binders when they are not in use. These devices may simply be tossed into a tool box or other type of storage bin but because of the presence of the hooks, they are prone to becoming entangled with each other. This, of course, makes it tedious and time consuming for the trucker when he/she next needs to next use the chain ratchet binders.

There is therefore a need in the art for a device that provides for storage of a plurality of chain ratchet binders when not in use and with which the chain ratchet binders may be quickly and easily engaged and disengaged.

BRIEF SUMMARY OF THE INVENTION

The device of the present invention comprises a rack that is configured to be fixedly secured to a generally vertical surface, preferably a surface on a truck or trailer body. (It will be understood that the rack may be fixedly secured to other surfaces, such as a surface of a wall inside a building, for example.) The rack is configured to store tie-down chain ratchet binders on the surface so that they do not tend to become entangled with each other, and are easy to engage with the rack and disengage therefrom. In particular the rack is mounted on the surface in a substantially vertical orientation so that the shafts of the chain ratchet binders are retained in a generally horizontal orientation. The orientation of the chain ratchet binders' shafts causes the hooks at either end of the shafts to hang downwardly adjacent the generally vertical surface of the truck. Additionally, hooks from different chain ratchet binders are retained so that they are vertically spaced from each other. Thus, the rack keeps the chain ratchet binders in an orderly fashion where they may be easily accessed and further stores the chain ratchet binders in such a manner that there is a reduced likelihood they will become entangled with each other.

A rack and method for storing tie-down chain ratchet binders on a surface, preferably on the surface of a truck wall. The rack includes a base that is mounted on a truck wall. A first finger is provided on the base and a first recess is defined in the first finger. The first recess is configured so that the shaft of a chain ratchet binder is receivable therein. The rack further includes a second finger spaced laterally from the first finger and defining a second recess therein that is aligned with the first recess. The shaft of the chain ratchet binder is received in the first and second recesses and is supported by the first and second fingers. A plurality of similarly aligned pairs of first and second fingers with associated first and second recesses is provided on the base, vertically spaced from each other. Thus, rack is able to store a plurality of chain ratchet binders vertically spaced from each other. The handles of the chain ratchet binders overlap each other and thereby aid in securing the same against the rack.

BRIEF DESCRIPTION OF THE SEVERAL VIEWS OF THE DRAWINGS

A preferred embodiment of the invention, illustrated of the best mode in which Applicant contemplates applying the principles, is set forth in the following description and is shown in the drawings and is particularly and distinctly pointed out and set forth in the appended claims.

FIG. 8 is a right side view of the chain ratchet rack of FIG. 7;

FIG. 9 is an enlarged partial right side view of the chain ratchet rack of FIG. 8;

Similar numbers refer to similar parts throughout the drawings.

DETAILED DESCRIPTION OF THE INVENTION

Figure 1:
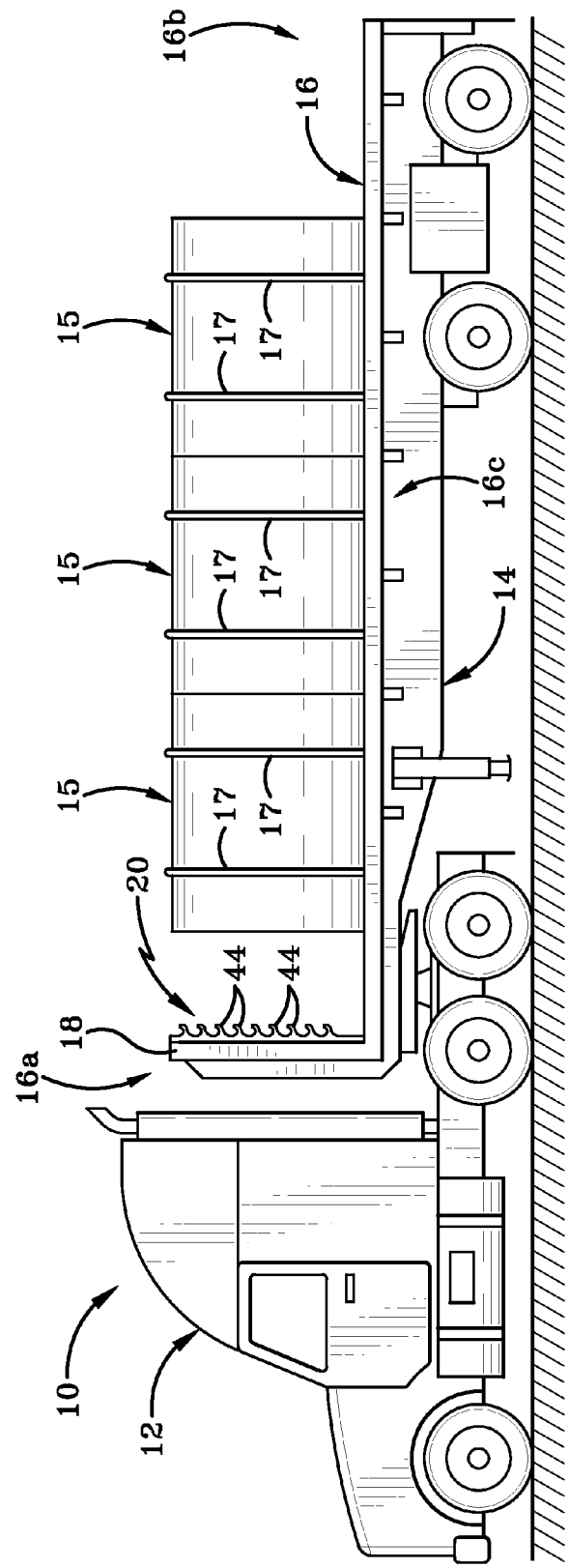
FIG. 1 is a left side elevational view of a truck pulling a flat bed trailer and showing the chain ratchet rack in accordance with the present invention.

Referring to FIG. 1 there is shown a truck 10 comprising a tractor 12 and a trailer 14. Trailer 14 includes a flat bed 16 having a wall at a front end 16a thereof. The wall includes a generally vertical surface 18. A load 15 is engaged on bed 16 and is tied down by a plurality of chains 17 which are secured by chain ratchet binders (not shown). A chain ratchet rack 20 in accordance with the present invention is engaged on surface 18. It will be understood that surface 18 may be provided on a wall disposed at the back end 16b of bed 16 or along sides 16c thereof without departing from the scope of the present invention. Still further, the generally vertical surface may form part of the rear wall of tractor 12 instead of being provided on trailer 14 without departing from the scope of the present invention. Essentially, truck 10 needs to present a sufficiently large enough generally vertical surface upon which to fixedly secure chain ratchet rack 20. It will be understood that in some instances, the truck surface upon which rack 20 is to be secured may include slightly angled sections. Rack 20 may be secured to a variety of truck or wall surfaces, whether strictly vertical or generally vertical. Of course, rack 20 may also be secured to an inclined surface or a horizontal surface without departing from the scope of the present invention. However, the inventor contemplates that a generally vertical surface is preferred as it allows the user to maximize storage space on the truck wall or on a wall in a building.

Figure 6:
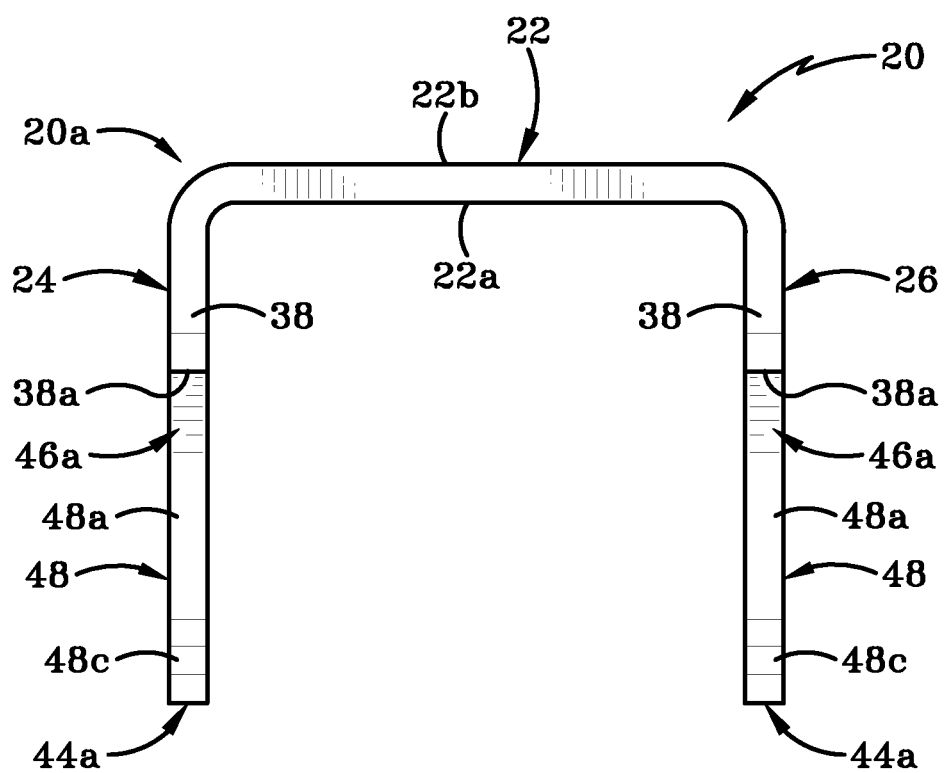
FIG. 6 is a top view thereof.

Rack 20 is shown in greater detail in FIGS. 2-9. Rack 20 comprises an elongate base that is generally U-shaped in cross-section when viewed from above or below (FIG. 6). The base has a first end 20a and a second end 20b (FIG. 2) and longitudinal axis "Y" (FIG. 5) extends from first end 20a to second end 20b. Rack 20 is secured to surface 18 so that longitudinal axis "Y" is substantially vertical and disposed at substantially at right angles with respect to bed 16.

Preferably, rack 20 is manufactured from HRPO steel (hot rolled pickled and oiled steel) that is around ¼" thick. Rack 20 is die-cut into a substantially planar blank and is then bent into the U-shaped component illustrated in the attached figures. It will be understood that rack 20 may be manufactured from any suitable strong and durable material other than HRPO steel without departing from the scope of the present invention.

The base of rack 20 preferably has a back wall 22, a first wall 24 and a second wall 26. Back wall 22 is a generally planar, rectangularly shaped member having a front surface 22a and a rear surface 22b. Rear surface 22b is configured to abut surface 18 when rack 20 is secured thereto. A plurality of longitudinally elongate apertures 28 are defined in back wall 22 at spaced apart intervals along the length "L" (FIG. 2) thereof. Preferably, rack 20 is around 59" in length, although any other suitably sized rack 20 is contemplated to fall within the scope of the present invention. Apertures 28 extend from front surface 22a through to rear surface 22b of back wall 28 and are provided to generally reduce the overall weight of rack 20. Preferably, each aperture 28 is around 13.75" long and the region of back wall 22 between adjacent apertures is around 2" long. The top region of back wall 22 between the uppermost end of the back wall, i.e., between the first end 20a of rack 20 and the first aperture 28, is around 3.5" long. The bottom region of back wall 22 between the bottom end of the last aperture 28 and the second end 20b of rack 20 is around 8.25" long. It will be understood that differently sized apertures 28 and regions between apertures 28 and the ends of back wall 22 may be utilized without departing from the scope of the present invention.

Figure 2:
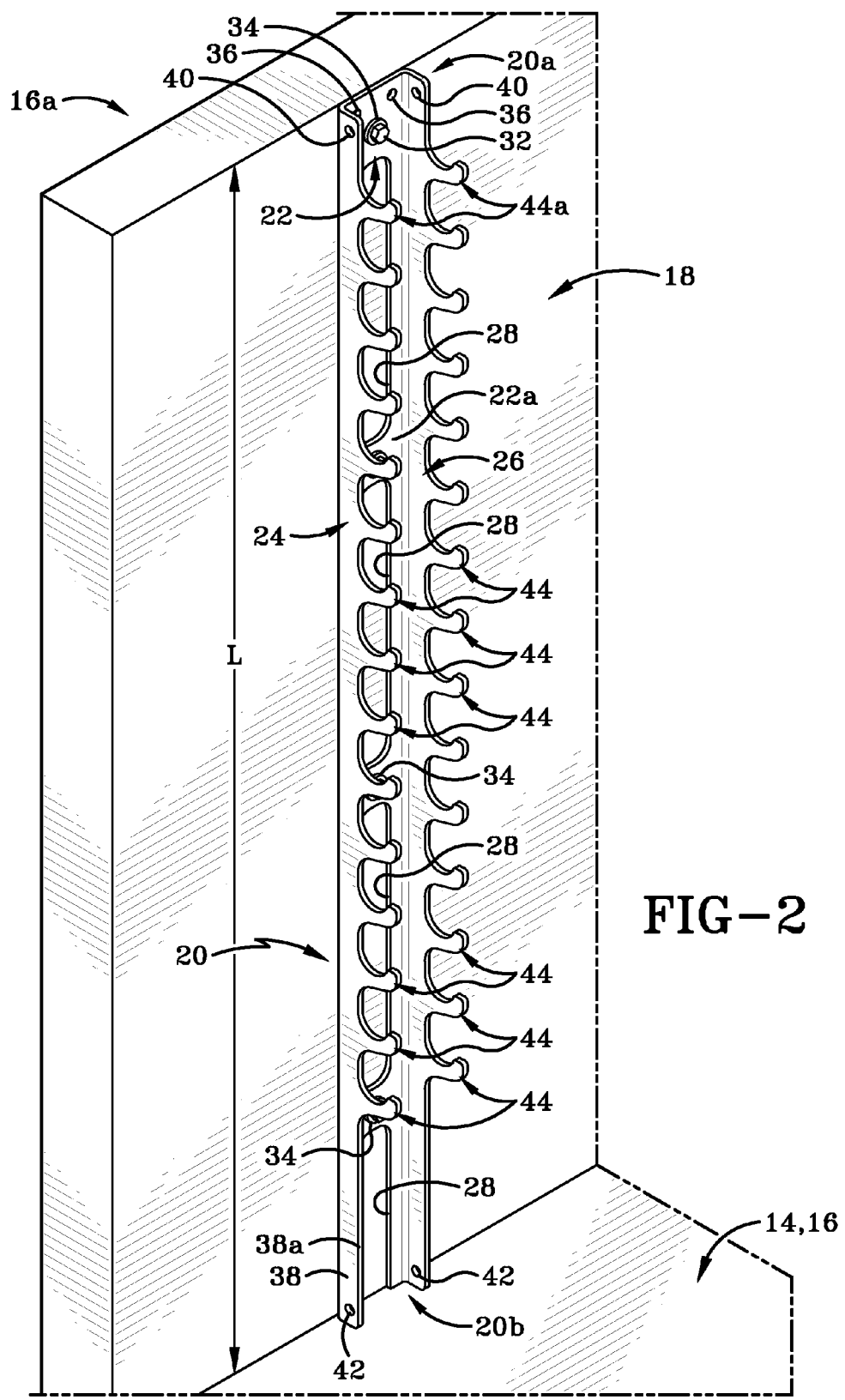
FIG. 2 is a perspective view of a portion of a generally vertical surface on the trailer body showing the chain ratchet rack in accordance with the present invention mounted thereon.
Figure 3:
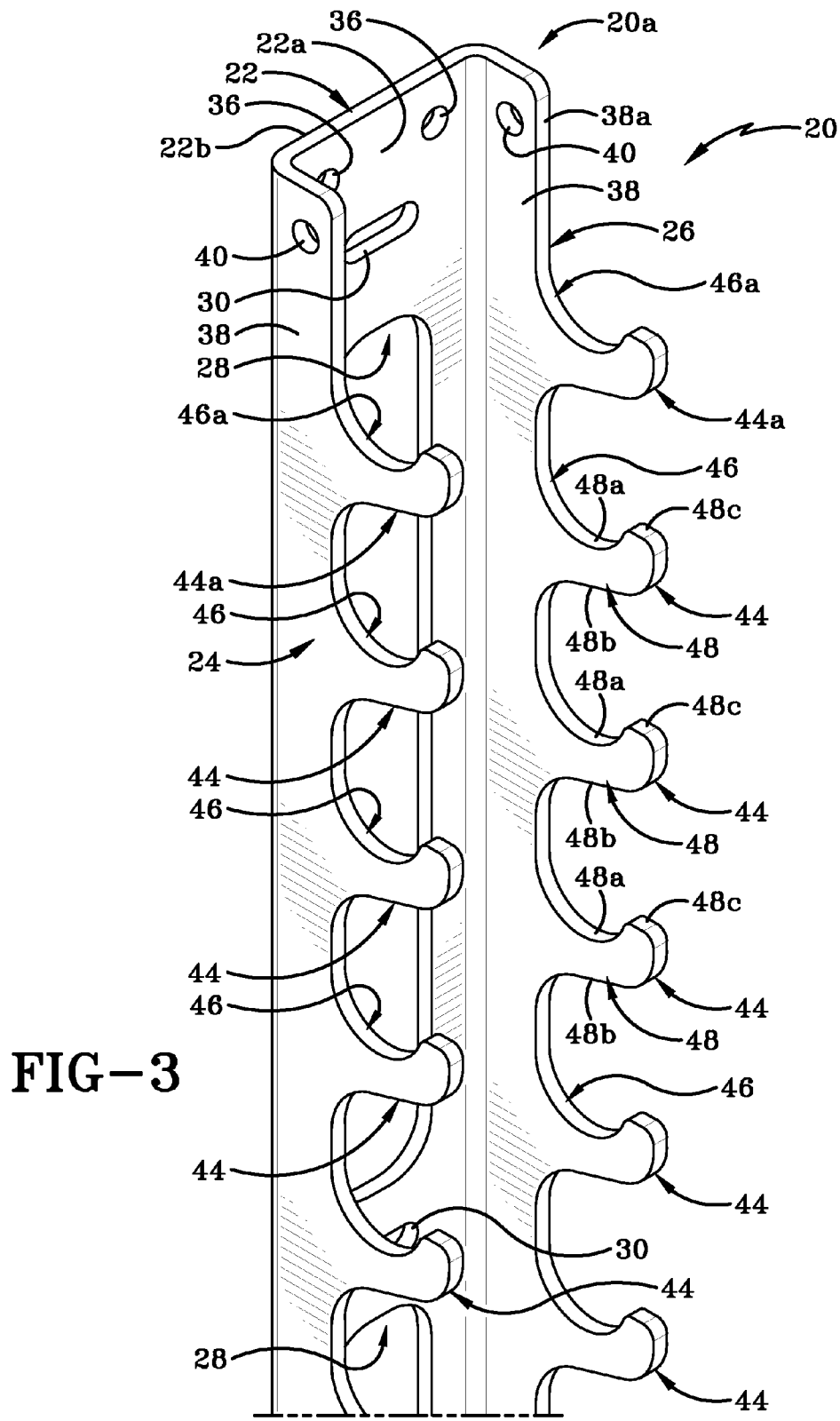
FIG. 3 is an enlarged partial perspective view of the chain ratchet rack shown detached from the generally vertical surface.

Preferably, as shown in FIG. 2, the aperture 28 defined between first and second walls 24, 26 proximate second end 20b of rack 20 is generally U-shaped and the two walls 24, 26 are not connected to each other at second end 20b. The gap defined between the bottom regions of walls 24, 26 is provided so that if truck surface 18 includes small strengthening ribs or gussets near its base, the gusset may be able to be received in the gap. This not only aids in locking rack 20 to surface 18 but also enables rack 20 to be used in locations on the truck wall that would normally not be suitable for mounting solid-backed components.

Rack 20 is secured to surface 18. Preferably, rack 20 is removably secured to surface 18. In accordance with the present invention, a fastener assembly is provided to secure rack 20 to surface 18. The fastener assembly preferably includes a plurality of elongate slots 30 which are defined in back wall 22 and extend from front surface 22a through to rear surface 22b thereof. Slots 30 are provided at spaced apart intervals from each other along the length "L" of rack 20. In particular, a slot 30 is defined in back wall 22 in each of those regions of the wall which are disposed intermediate adjacent apertures 28, as well as above the first aperture and below the last aperture. Each slot 30 is oriented substantially at right angles to longitudinal axis "Y". The fastener assembly also includes a plurality of fasteners which extend through slots 30 to secure rack 20 to surface 18. As illustrated herein the fasteners comprise bolts 32 and washers 34 and nuts (not shown) which are utilized with bolts 32 to secure rack 20 to surface 18. It will be understood that any other suitable fasteners may be used to secure rack 20 to surface 18 without departing from the scope of the present invention.

It will further be understood that instead of using slots 30 and fasteners such as bolts 32 to secure rack 20 to surface 18, back wall 22 may be fixedly secured to surface 18 by welding or by an adhesive. Any suitable method of securement of the rack 20 to surface 18 may be utilized without departing from the scope of the present invention.

Rack 20 preferably also defines a pair of spaced apart holes 36 proximate first end 20a thereof. Holes 36 extend from front surface 22a through to rear surface 22b of back wall 22. Similar holes (not shown) may be defined in back wall 22 proximate second end 20b. Although not illustrated herein, it will be understood that holes 36 may also be utilized to receive fasteners to secure rack 20 to surface 18, particularly to vertical ribs (not shown) which may project outwardly from surface 18.

As indicated above, the U-shaped base includes first and second walls 24, 26 that extend outwardly from front surface 22a of back wall 22. Preferably, first and second walls 24, 26 extend outwardly from front surface 22a in generally the same direction. Furthermore, first and second walls 24, 26 preferably are disposed at right angles to front surface 22a of back wall 22 and first and second walls 24, 26 are parallel to each other. First and second walls 24, 26 are generally planar members that are spaced apart from each other and are substantially identical to each other.

In accordance with a specific feature of the present invention, each of first and second walls 24, 26 includes a generally vertical rectangular region 38 which extends from proximate first end 20a of rack 20 to second end 20b thereof. Region 38 is of a width "W1" (FIG. 4) and is of a length "L" equal to that of back wall 22. (The total width of each of first and second walls 24, 26 is "W2" as measured from rear surface 22b of back wall 22 to outermost edges of tips 48c of fingers 44, 44a.) Region 38 preferably is substantially continuous and unbroken along its length except for a first hole 40 defined a short distance inwardly from first end 20a of rack 20 and forwardly away from back wall 22. A similar second hole 42 (FIG. 2) is defined a short distance inwardly from second end 20b of rack 20 and forwardly from back wall 22. Region 38 generally includes a front edge 38a.

In accordance with a specific feature of the present invention, each of first and second walls 24, 26 includes a plurality of curved fingers 44, 44a which extend outwardly from region 38. Fingers 44, 44a preferably are integral and continuous with region 38 and are coplanar therewith. Each finger 44, 44a of first wall 24 is horizontally aligned with a complementary shaped and sized finger 44, 44a on second wall 26. Vertically adjacent fingers are separated from each other by an aperture 46, 46a. Each apertures 46, 46a in first wall 24 is complementary sized, shaped and horizontally aligned with an aperture 46, 46a in second wall 26.

Figure 4:
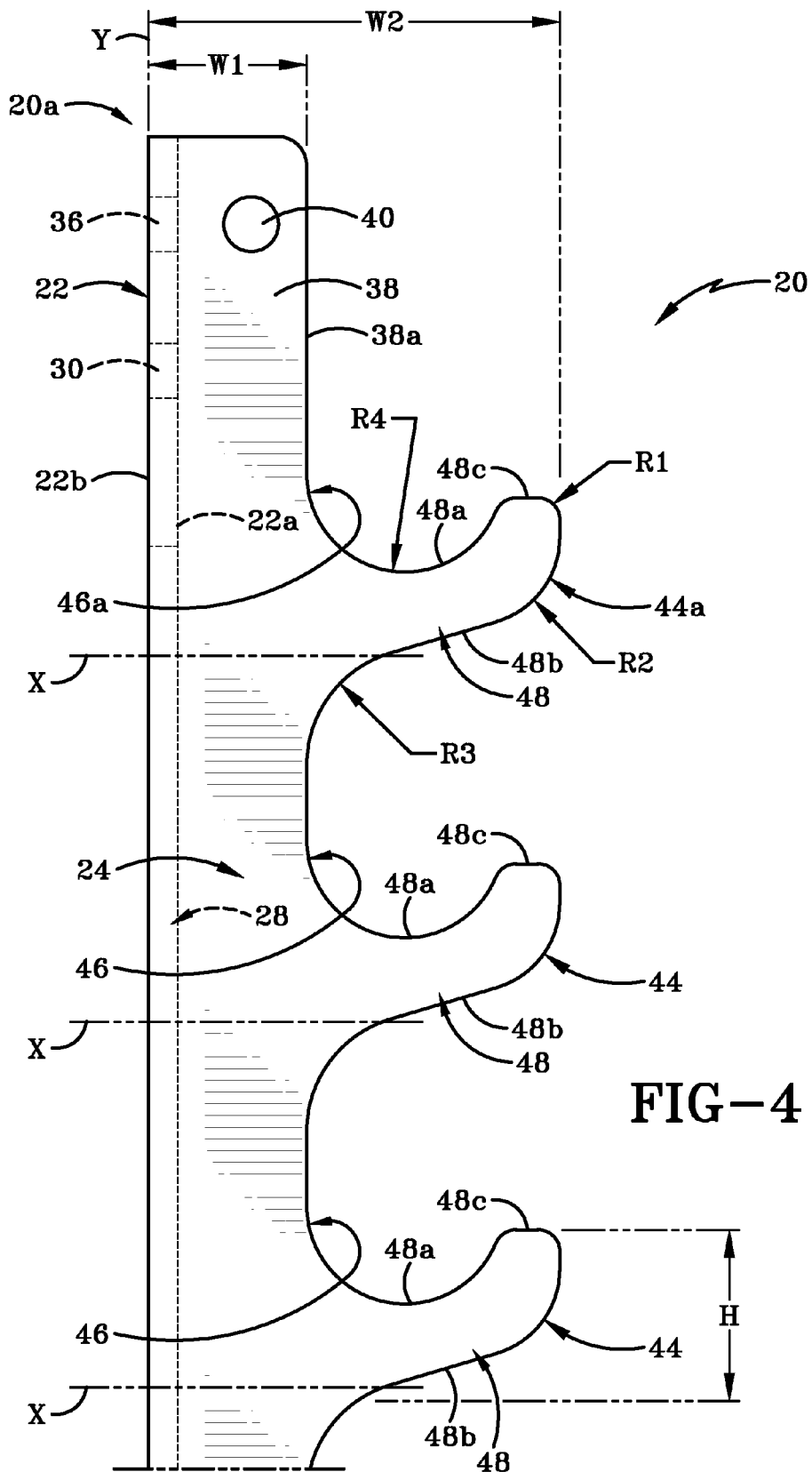
FIG. 4 is an enlarged right side view of the chain ratchet rack of FIG. 3.
Figure 5:
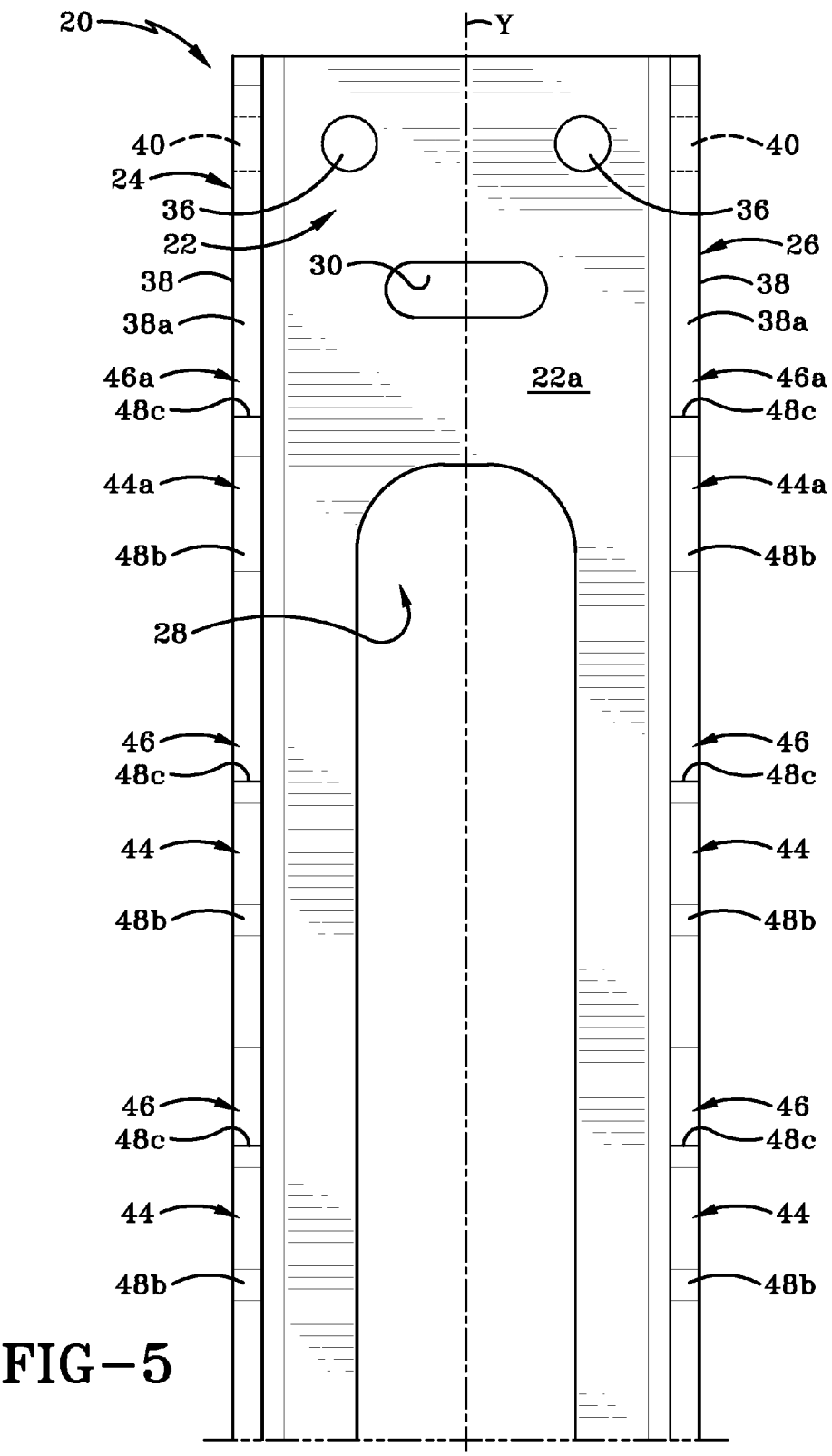
FIG. 5 is a front view of the chain ratchet rack.

Fingers 44, 44a are disposed at regular intervals from each other along length "L" of rack 20. Each finger 44, 44a includes a curved shaft 48 which is integrally formed with region 38 and extends outwardly away from the front edge 38a thereof. Shaft 48 has an upper surface 48a and a lower surface 48b and terminates in a tip 48c. Shaft 48 curves upwardly away from a horizontal axis "X", where axis "X" is disposed at right angles to longitudinal axis "Y". The curvature of shaft 48 is such that tip 48c is disposed a height "H" above the region where shaft 48 joins region 38. FIG. 4 shows the radii of curvature of the various regions of fingers 44. Radius of curvature R1 preferably is 0.188; R2 preferably is 0.75, R3 preferably is 1.00, and R4 preferably is 0.844.

Each aperture 46 is disposed between a pair of adjacent fingers 44, with the exception of the first aperture 46a which is located between first end 20a of rack 20 and uppermost finger 44a. As can be seen from FIG. 4, first apertures 46a are generally J-shaped. The rest of the apertures 46 defined in rack 20 are generally C-shaped. Each aperture 46 is defined by a lower surface 48b of a first finger 44, 44a, a section of front edge 38a of region 38 and upper surface 48a of the second finger 44 that is disposed adjacent to and vertically beneath the first finger. The portion of aperture 46, 46a which is defined in upper surface 48a of each finger 44, 44a comprises a recess that is defined in the upper surface 48a of that finger 44, 44a. These recesses are concave and are substantially semi-circular in shape, as is best seen in FIG. 4.

Figure 7:
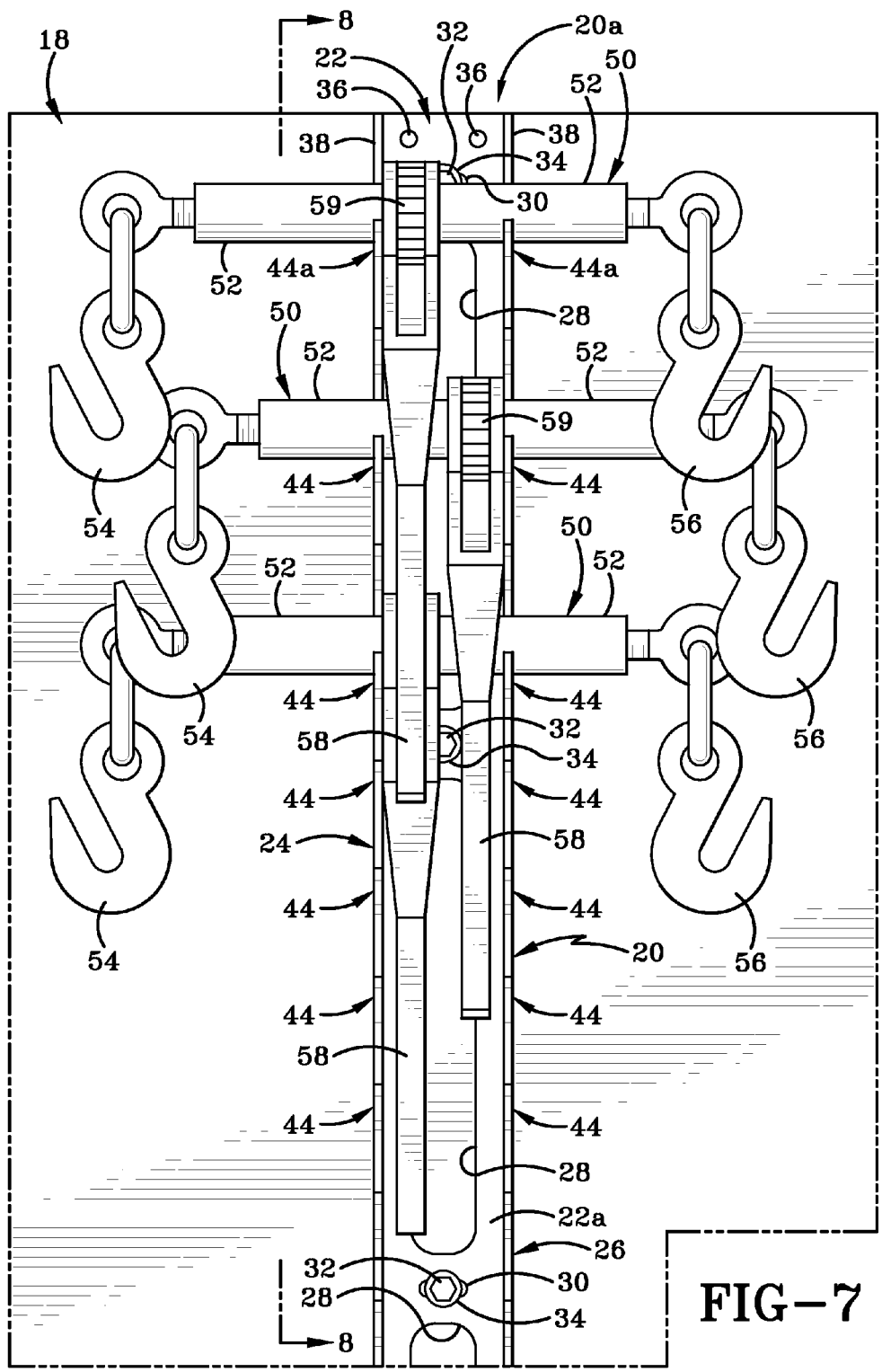
FIG. 7 is a front view of the chain ratchet rack in accordance with the present invention and showing a plurality of chain ratchet binders engaged therewith.

Referring to FIGS. 7-9, rack 20 is shown in use, secured to the generally vertical surface 18 and supporting a plurality of chain ratchet binders 50 therein. Each chain ratchet 50 includes a shaft 52, a pair of hooks 54, 56 engaged with shaft 50, and a handle 58 that is engaged with a ratchet mechanism 59 on shaft 58. Shaft 52 is a tubular member that is circular in cross-section as shown in FIGS. 8 and 9. Each chain ratchet 50 is engaged on a pair of horizontally aligned fingers 44, 44a of first and second walls 24, 26. In particular, shaft 52 of the chain ratchet 50 is engaged in the apertures 46, 46a defined by fingers 44, and 44a. The weight of shaft 52 is supported by the fingers 44, 44a.

In accordance with a particular feature of the present invention, the curvature of fingers 44 is such that the curvature of the lower regions of apertures 46 defined by adjacent pairs of fingers 44 is substantially complementary to the curvature of the circular shaft 52 of chain ratchet binders 50. The curvature of aperture 46a is also substantially complementary to the curvature of the circular shaft. Additionally, the size of the apertures 46, 46a closely approximates the diameter of shaft 52. The upwardly extending curvature of fingers 44, 44a is such that it is easier to insert shafts 52 into apertures 46, 46a and to remove the shafts therefrom. Thus, when chain ratchet binders 50 are supported as illustrated in FIG. 7, shaft 52 is effectively snap-fitted and frictionally retained in the aperture 46 defined by those fingers 44 with which chain ratchet binder 50 is engaged.

Each of a plurality of chain ratchet binders 50 is engaged in one of the apertures 46, 46a defined by a different aligned pair of fingers 44, and 44a on first and second walls 24, 26. When the plurality of chain ratchet binders 50 are so engaged, the shafts 52 thereof may be slightly horizontally offset relative to each other so that the handles 58 thereof lay vertically one above the other as illustrated in FIGS. 7-9. When handles 58 are horizontally offset from each other, they don't project outwardly for too great a distance from rack 20. Handles 58 on chain ratchet binders 50 vertically higher up on rack 20 aid in keeping shafts 52 of those chain ratchet binders 50 disposed vertically beneath them engaged with rack 20. FIG. 9 illustrates this situation. In this figure it can be seen that handle 58a of chain ratchet binder 50a contacts the exterior surface of shaft 52b of chain ratchet binder 50b, thus keeping chain ratchet binder 50b engaged with fingers 44b of rack 20.

When a trucker wishes to use one of the chain ratchet binders 50 to tie down a load 60 on truck 10, they simply grasp shaft 52 of chain ratchet binder 50a, for example, and pull it upwardly in the direction of arrow "A". This motion moves shaft 52 out of recess 46a in which that chain ratchet binder 50a was engaged. Chain ratchet binder 50a may then be used to secure one of chains 17 to load 15. When the trucker wishes to replace chain ratchet binder 50a, shaft 52a is repositioned in aperture 46a and is pushed rearwardly toward back wall 22 and downwardly in the direction opposite to arrow "A". This snap-fits shaft 52a back into aperture 46a and shaft 52a is then held therein by friction. The curvature of the recess in the lower finger 44a with which shaft 52a is engaged aids in preventing shaft 52a from popping back out of aperture 46a.

Figure 10:
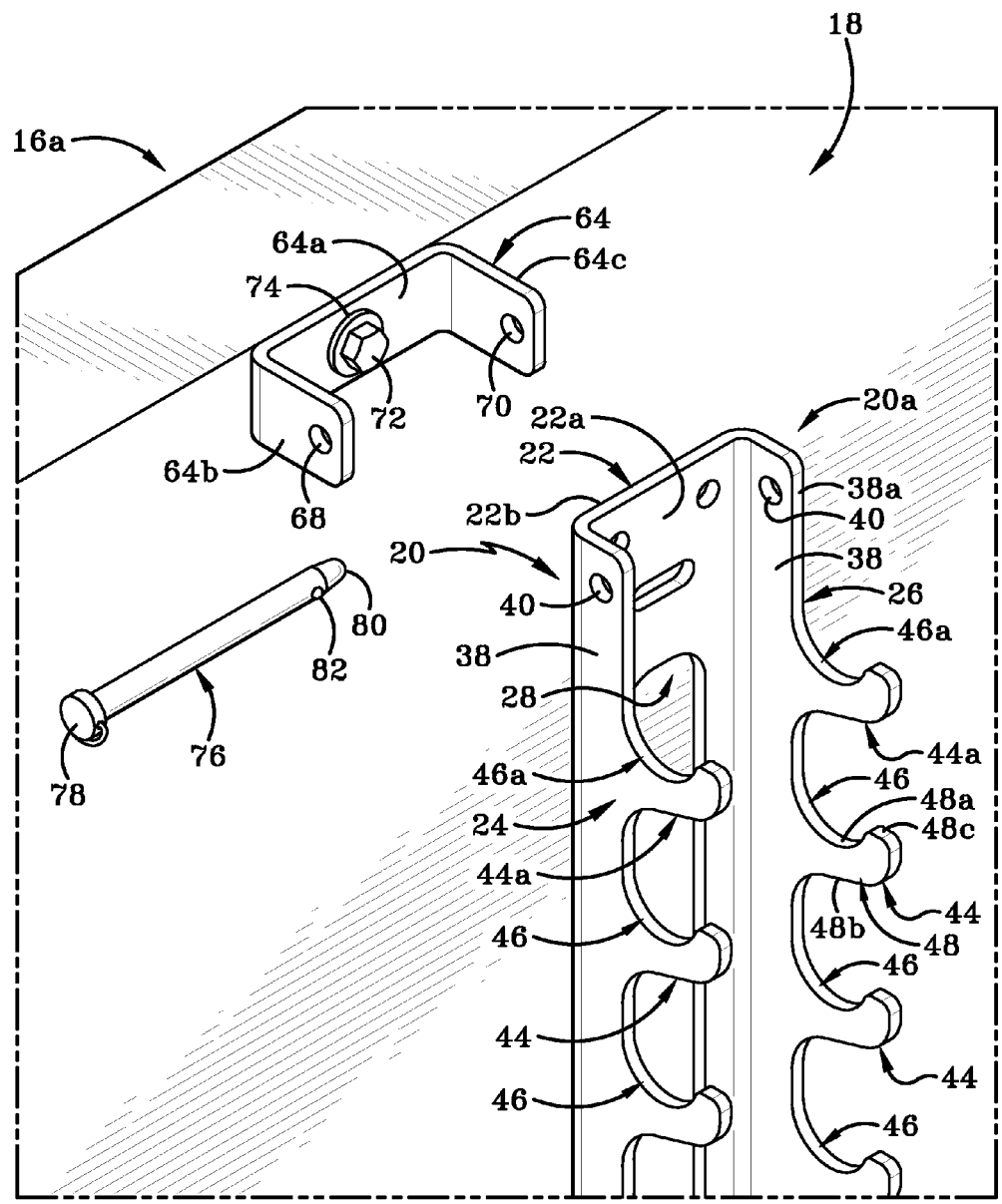
FIG. 10 is an exploded partial perspective view of the ratchet rack in accordance with the present invention shown with a bracket that is used to mount the rack to a vertical wall.
Figure 11:
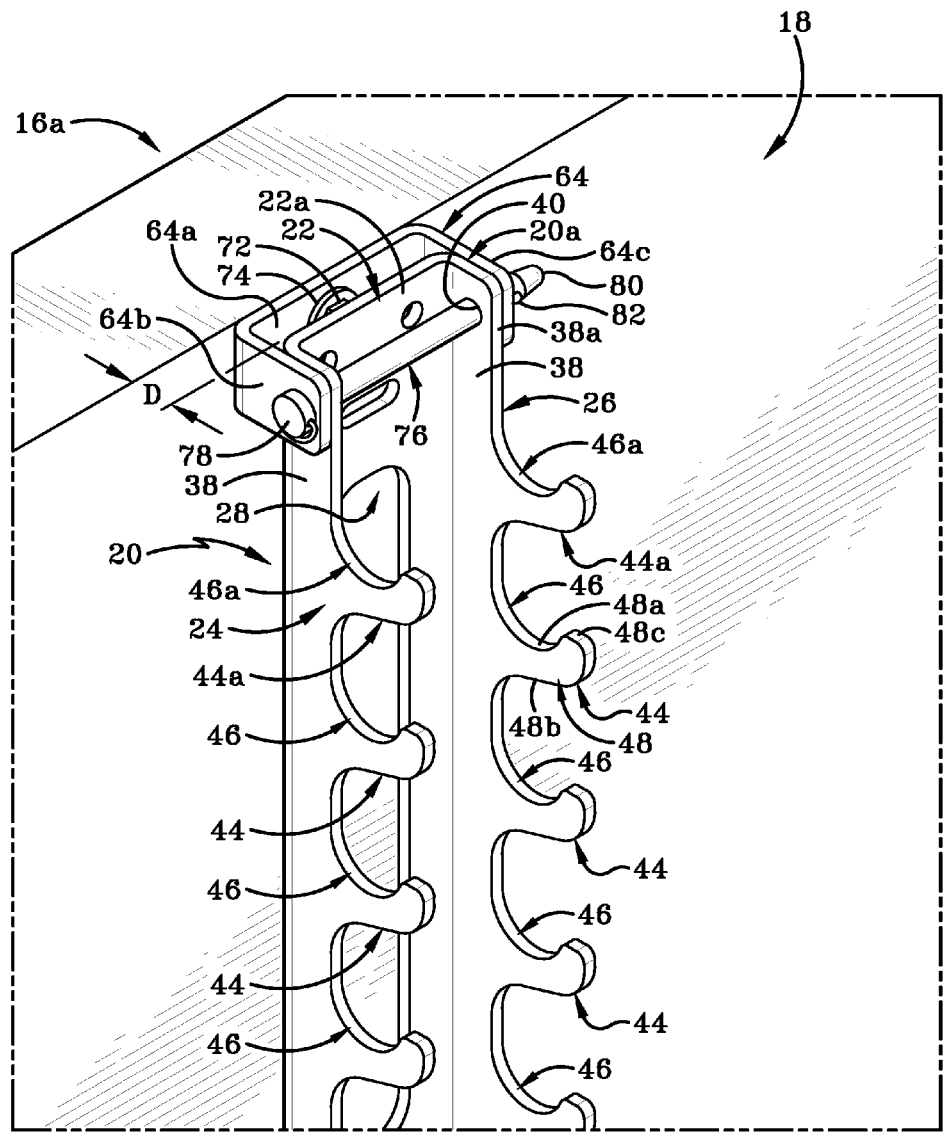
FIG. 11 is a partial perspective view of the ratchet rack engaged with the bracket and mounted to a vertical wall.

FIGS. 10 and 11 illustrate an alternative way of mounting rack 20 to a vertical surface 18. In accordance with the present invention there is provided a U-shaped bracket 64 and a pin 66 that are used to mount first end 20a of rack 20 to surface 18. Bracket 64 includes a back 64a and first and second side walls 64b, 64c which extend outwardly away from back 64a. First and second side walls 64b, 64c are disposed generally at right angles to back 64a. The width between the interior surfaces of side walls 64b, 64c preferably is slightly larger than the width between the exterior surfaces of first and second walls 24, 26 of rack 20. Consequently, rack 20 is able to be received between the interior surfaces of first and second side walls 64b, 64c of bracket 64. A first hole 68 is defined in first side wall 64b and a second hole 70 is defined in second side wall 64c. First and second holes 68, 70 are horizontally aligned with each other and are positioned to be alignable with first holes 40 in rack 20. Although it is not illustrated herein, an aperture is defined in back 64a of bracket 64. A bolt 72 is inserted into this aperture to secure bracket 64 to surface 18. A washer 74 is illustrated as being used in combination with bolt 72 and it will be understood that a nut (not shown) may also be used to secure bolt 72 in place.

When it is necessary, for some reason, for rack 20 to be mounted a spaced distance from the wall or for the second end 20b (FIG. 2) of rack 20 to be able to be moved out of vertical alignment with the first end 20a thereof, then bracket 64 is mounted on surface 18, and rack 20 is secured to bracket 64. In particular, rack 20 is inserted into the space between the interior surfaces of first and second side walls 64b, 64c of bracket 64 so that first and second holes 68, 70 in bracket 64 and first holes 40 in rack are aligned. A pin 76 is then inserted through the aligned holes 68, 40, 70, 40. Pin 76 includes a head 78 and a terminal end 80. Head 78 is greater in diameter than holes 68 or 70. Pin 76 is of a length that terminal end 80 extends outwardly for a distance beyond second hole 70. Pin 76 further includes a spring-loaded button 82 which is able to be depressed as the shaft of pin 76 is inserted through the aligned holes but will extend outwardly from pin when terminal end 80 exits second hole 70. The button 82 prevents pin 76 from being withdrawn through the aligned holes and thereby secures rack 20 to bracket 64.

Because of the engagement of rack 20 with bracket 64, back wall 22 of rack 20 is spaced a distance "D" (FIG. 11) from surface 18. It will be understood that in order to position rack 20 a particular distance away from surface 18, any one of a number of differently sized brackets 64 may be used to mount rack 20 to the wall. Additionally, bracket 64 may be provided with a series of spaced apart aligned pairs of holes 68, 70 therein which will enable the user to select the appropriate pair to position the rack 20 at the desired distance from the surface 18.

Bracket 64 also enables rack 20 to be pivoted about pin 76 so that the second end 20b (FIG. 2) of rack 20 may be moved a distance greater than distance "D" away from the surface 18. So, for example, if surface 18 is not vertical along its entire height, bracket 64 enables second end 20b of rack to be shifted vertically inwardly towards the wall or vertically outwardly away therefrom. Thus, rack 20 may be secured to surface 18 at any desired angle.

It will further be understood that U-shaped bracket 64 may, instead, be engaged with second end 20b of rack 20 to secure the same to surface 18 in order to accommodate engagement thereof to a differently angled and configured surface 12. In this instance, the pin 76 used to secure bracket 64 to rack would be passed through holes 42 in walls 24, 26 at second end 20b.

Although not illustrated herein, it will be understood that additional pairs of aligned holes may be defined in walls 24, 26 at intervals between first and second ends 20a, 20b of rack 20. Additional U-shaped brackets may be engaged with these additional pairs of aligned holes to locate rack a spaced distance from surface. It will further be understood that if surface 18 is configured so that it is impossible to use a single U-shaped bracket 64, two smaller L-shaped brackets may be secured to surface 18 adjacent the pairs of aligned holes, such as holes 40 or 42 to mount rack 20 a spaced distance from surface 18.

Instead of rack 20 having spaced apart first and second side walls 24, 26 which extend outwardly from back wall 22, and each of those side walls 24, 26 define a recess such as 46a, 48a therein, rack 20 may be formed to have a single substantially solid wall extending across the entire front region of back wall 22 with a single elongate finger formed in that solid wall and extending outwardly from back wall 22. The single elongate finger will extend from one side of the base to the other. Furthermore, a single elongate recess will be defined in the single elongate finger. Rack would then preferably be provided with a plurality of vertically spaced fingers that extend from one side of back wall 22 to the other; with each of these fingers defining a recess therein that extends from one side of back wall 22 to the other.

Although not illustrated herein, it will be understood, that first and second walls 24, 26 may be disposed at angles other than right angles to front surface 22a of back wall 22. The only requirement for the angle involved is that a shaft of a chain ratchet binder be able to be received in the recessed regions of the fingers 44, 44a of these divergent first and second walls. For instance, the first wall may extend outwardly away from front surface 22a at an angle of approximately 80° in a first direction and the second wall may extend outwardly from front surface 22a at an angle of around 80° in a second direction, so that first and second walls diverge away from each other as you move away from front surface 22a. The recesses, such as 46a or 48a in the fingers 44, 44a in these divergent walls need to be able to support the weight of the shaft of a chain ratchet binder therein.

It will further be understood that if the shaft of the chain ratchet binder is manufactured to have a cross-section that differently configured to the circular cross-section of shaft 52, it is contemplated that the rack in accordance with the present invention will be manufactured with fingers, recesses and apertures that are of a complementary size and shape to the differently configured shaft. Thus, the complementary fingers, recesses and apertures will be able to snap-fittingly receive the differently shaped shaft therein and to retain the same therein by frictional engagement.

It is also contemplated that some type of locking mechanism could be provided on rack 20 to lock the engaged chain ratchet binders 50, 52 thereto.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention are an example and the invention is not limited to the exact details shown or described.

The invention claimed is:

1. A rack for storing tie-down chain ratchet binders, said rack comprising:
    a monolithic base adapted to be mounted on a mounting surface, said base comprising:
        a back wall with a front surface and a rear surface, wherein the rear surface is adapted to abut the mounting surface;
        a first wall extending outwardly from the front surface of the back wall;
    wherein the base is a single component and the first wall is permanently secured to the back wall;
        a first finger provided on the first wall; and
        a first recess defined in the first finger; and wherein the first recess is adapted to receive a shaft of a chain ratchet binder therein.

2. The rack as defined in claim 1, wherein the first recess is concave and has a radius of curvature that is adapted to be generally complementary to a curvature of at a least a portion of an exterior surface of the shaft of the chain ratchet binder that is to be received therein.

3. The rack as defined in claim 1, wherein the first finger has an upper surface and a lower surface, and the first recess is defined in the upper surface thereof; and wherein the first finger is adapted to support the weight of the shaft of the chain ratchet binder thereon when the chain ratchet binder is received in the first recess.

4. The rack as defined in claim 1, wherein the first finger includes a terminal region that forms an upwardly extending hook; and wherein the first finger is adapted to receive the portion of the shaft of the chain ratchet binder in the first recess and between the back wall and the hook and to snap-fittingly receive the shaft of the chain ratchet binder therein and to retain the shaft therein by friction.

5. The rack as defined in claim 1, wherein the base further comprises:
    a second wall permanently secured to the back wall and extending outwardly from the front surface thereof in the same direction as the first wall; and further comprising:
    a second finger provided on the second wall, said second finger being spaced a distance from the first finger; and
    a second recess defined in the second finger; and wherein the second recess is aligned with the first recess in the second finger; and wherein the first and second recesses of the rack are adapted to receive the shaft of the chain ratchet binder therein.

6. The rack as defined in claim 5, wherein the first finger has an upper surface and a lower surface, and the first recess is defined in the upper surface; and the second finger has an upper surface and a lower surface, and the second recess is defined in the upper surface of the second finger; and wherein the first and second fingers are complementary to each other and are adapted to support the weight of the shaft of the chain ratchet binder thereon when the chain ratchet binder is received in the first and second recesses.

7. The rack as defined in claim 5, wherein the second finger is spaced horizontally from the first finger and the second recess is horizontally aligned with the first recess; and wherein the first and second fingers comprise a first aligned pair of fingers.

8. The rack as defined in claim 7, further comprising at least a second aligned pair of first and second fingers spaced a distance vertically away from the first aligned pair of fingers, and wherein a first recess and a second recess are defined in the first finger and the second finger of the second aligned pair of fingers, respectively, and wherein the first and second recesses of the second aligned pair of fingers are adapted to engage a shaft of a second chain ratchet binder therein.

9. The rack as defined in claim 8, further comprising a first aperture defined between the first finger of the first aligned pair of fingers and the first finger of the second aligned pair of fingers, and a second aperture defined between the second fingers of the first and second aligned pairs of fingers; and wherein the first and second apertures are horizontally aligned with each other.

10. The rack as defined in claim 9, wherein each of the first and second apertures is generally C-shaped when viewed from the side.

11. The rack as defined in claim 5, wherein
the first and second walls are disposed a spaced distance laterally apart from each other; and wherein the first finger is disposed on the first wall and the second finger is disposed on the second wall.

12. The rack as defined in claim 11, wherein the first and second fingers curve upwardly away from a horizontal axis that is disposed generally at right angles to the front surface of the back wall of the rack.

13. In combination,
a tie-down ratchet assembly for a truck, said ratchet assembly having an elongated shaft with a hook member extending outwardly from each end of the shaft, and a ratchet mechanism provided on the shaft at a location disposed between the ends thereof, and wherein the shaft is generally circular in cross-section and is of a first diameter; and
a rack for storing the ratchet assembly thereon, said rack comprising:
a monolithic base adapted to abut a wall surface on the truck; said base comprising:
a back wall with a front surface and a rear surface, wherein the rear surface is adapted to abut the wall surface on the truck;
a first wall and a second wall extending outwardly from the front surface of the back wall; wherein the base is a single component and the first wall and second wall are permanently secured to the back wall and spaced apart from each other;
a first finger provided on the first wall;
a first recess defined in the first finger;
a second finger provided on the second wall, said second finger being horizontally aligned with the first finger so as to form a first aligned pair of fingers; and
a second recess defined in the second finger; wherein the first and second recesses are horizontally aligned with each other; and wherein the first and second recesses receive the shaft of the ratchet assembly therein.

14. The combination as defined in claim 13, wherein the first aligned pair of fingers is configured to support the weight of the shaft of the ratchet assembly when it is received in the first and second recesses.

15. The combination as defined in claim 14, wherein the first and second recesses are concave and defined in an upper surface of each of the first and second fingers; and the first and second recesses each have a radius of curvature that is substantially the same as a radius of curvature of the shaft of the ratchet assembly.

16. The combination as defined in claim 15, wherein the shaft of the ratchet assembly is snap-fittingly engaged in the first and second recesses and retained therein by friction.

17. A rack for storing tie-down chain ratchet binders, said rack comprising:
a base adapted to be mounted on a mounting surface, said base being a monolithic single component comprising:
a back wall with a front surface and a rear surface, wherein the rear surface is adapted to abut the mounting surface; a first wall and a second wall extending outwardly from the front surface of the back wall in the same direction, and wherein the first and second walls are parallel to each other;
a first finger provided on the first wall and a first finger provided on the second wall; wherein the first fingers are horizontally aligned with each other as a first horizontally aligned pair of fingers; and
a first recess defined in each of the first fingers; wherein the first recesses in the first and second walls are substantially identical in shape and are horizontally aligned with each other; and wherein the first recesses are adapted to receive a shaft of a chain ratchet binder therein.

18. The rack as defined in claim 17, wherein the first and second walls are integral with and permanently secured to the back wall from a top end of each the first and second walls to a bottom end thereof.

19. The rack as defined in claim 17, wherein the first and second walls are in a fixed and non-adjustable orientation relative to each other.

20. The rack as defined in claim 17, wherein the base is U-shaped when viewed from each of a top end and a bottom end thereof.

21. The rack as defined in claim 17, wherein each of the first and second walls includes a plurality of aligned pairs of fingers in addition to the first aligned pair of fingers, and the plurality of aligned pairs of fingers includes an uppermost pair, a second from uppermost pair and continuing through to a bottommost pair; and every finger of the plurality of aligned pairs of fingers is substantially identical to the first fingers and each defines a recess therein that is substantially identical to the first recesses; and wherein the fingers on each of the first and second walls are spaced at regular vertical intervals relative to each other.

22. The rack as defined in claim 21, wherein each of the fingers on the first and second walls extends outwardly from the back wall for a length; and the lengths of all of the fingers are the same.

23. The rack as defined in claim 21, wherein an aperture is defined between each pair of vertically adjacent fingers on each of the first and second walls; and the apertures are adapted to receive a section of the shaft of ratchet binder therein; and wherein all of the apertures on the first and second walls are of substantially the same size and shape.

24. The rack as defined in claim 23, wherein the apertures are each generally C-shaped when viewed from the side.

* * * * *